United States Patent [19]
Weil

[11] Patent Number: 6,124,016
[45] Date of Patent: Sep. 26, 2000

[54] COMPOSITE CONNECTION AND METHOD OF MAKING SAME

[76] Inventor: Stuart L. Weil, 1055 W. San Bruno, Fresno, Calif. 93711

[21] Appl. No.: 09/136,476

[22] Filed: Aug. 19, 1998

[51] Int. Cl.⁷ ................................................... B32B 31/04
[52] U.S. Cl. .................... 428/99; 428/343; 52/718.01; 24/DIG. 11; 156/91; 156/94; 156/71; 156/297
[58] Field of Search .................................. 156/91, 92, 71, 156/94, 297; 428/99, 343; 52/718.01; 24/289, DIG. 11

[56] References Cited

U.S. PATENT DOCUMENTS

| | | |
|---|---|---|
| 4,004,387 | 1/1977 | Ellingson . |
| 4,778,702 | 10/1988 | Hutter, III . |
| 4,987,699 | 1/1991 | Gold ..................................... 156/108 X |
| 5,037,444 | 8/1991 | Phillips . |
| 5,087,311 | 2/1992 | Elliott et al. . |
| 5,192,605 | 3/1993 | Mercuri et al. . |
| 5,305,507 | 4/1994 | Dvorsky . |
| 5,593,752 | 1/1997 | Pollatta et al. . |
| 5,853,895 | 12/1998 | Lewno ................................ 156/108 X |

*Primary Examiner*—Sam Chuan Yao
*Attorney, Agent, or Firm*—Richard A. Ryan

[57] ABSTRACT

A composite connector comprising a plate having a plurality of perforations therethrough attached to a laminate surface with adhesive material, such as resin, and strips of fibrous laminae material, such as fiberglass, carbon or the like. The composite connector is useful for connecting a metallic object, such as a leg, brace, pole, wire or the like, to a laminate surface, such as a fiberglass tank. The composite connector allows the object to be removably connected to the laminate surface without damaging the integrity of the laminate surface. The composite connector is suitable for use with a variety of fibrous laminae and adhesives.

9 Claims, 3 Drawing Sheets

COMPOSITE CONNECTION AND METHOD OF MAKING SAME

BACKGROUND OF THE INVENTION

1. Field of the Invention

The field of the present invention relates generally to articles of manufacture used to connect two components together. More particularly, the present invention relates to connectors that are used to connect a component to a non-metallic object. Even more particularly, the present invention relates to connectors that can connect a leg, bar, mast and other such components to objects made of non-metallic laminate materials such as those made from fiberglass, carbon, graphite or Kelvar.

2. Background

A variety of products are made from non-metallic, non-wood (i.e., man-made) materials due to the favorable characteristics of these materials, including lighter weight, increased corrosion resistance and moldability. For increased strength and other properties, these materials often incorporate inorganic fibrous reinforcements such as glass, carbon, graphite or Kelvar (a DuPont product). Examples of products which use these non-metallic, non-wood materials include storage tanks, rods, poles, boats, and panels.

The products made from the materials described above are typically manufactured from a mold process which allows the fibrous material to be incorporated into a resin material molded to the desired size and shape. To facilitate repair work, such as patching holes, etc., the inorganic fibrous materials are also provided in tape or sheet form. With the proper resin and curing process, a person can repair a hole or other defect in the product and restore it to its original condition (i.e., ability to hold fluid).

In use with products made from these non-metallic materials or having non-metallic surfaces, the manufacturer or user often finds it necessary to connect a component, such as a leg, brace, pole or wire, to the non-metallic product or surface. Many times these add-on components are made of metal. The present methods of connecting a metal component to a non-metallic product include attachment with an adhesive or drilling a hole in the product and connecting the component directly to the product (i.e., with a bolt or screw). Both of these methods have significant limitations, including dependence on the strength of the adhesive when using an adhesive only and the necessity of violating the integrity of the product in order to drill a hole when using a bolt or screw as a connector.

As an example, many people find it necessary to attach a fiberglass storage tank directly to a metal stand or rack to hold the tank above the ground or to secure it in place. When the tank is designed to hold fluids, the user is justifiably concerned with holes drilled in the tank to attach the tank to the metal stand or rack. Adhesives generally available are either not suitable for securely attaching the tank to the stand or rack or they unacceptably restrict the user's ability to take down or disassemble the tank and stand/rack assembly.

A connector is needed to facilitate securely connecting a leg, brace or other component to a non-metallic structure that allows the user of the structure to disassemble the component from the structure when desired.

SUMMARY OF THE INVENTION

The composite connector in accordance with the present invention solves the problems identified with the current methods of connecting a component to a non-metallic surface. That is to say, the present invention provides a composite connector that is suitable for connecting a leg, brace, wire or other component to a non-metallic product or surface without violating the integrity of the product or surface and maintaining the user's ability to disassemble the component from the product or surface when its use is no longer needed.

The present invention provides a composite connector and method of making the same that utilizes a plate and a connecting device on the plate to connect a non-metallic structure or surface (i.e., a laminate surface) to a component, particularly metallic components. The plate can be made of metal or various non-metals and be of virtually any shape and size. Ideally, the plate should have a substantially uniform thickness and be substantially rigid. Uniform thickness is desired to enable strips or sheets of laminate material on a fibrous putty to be placed over the plate, as described herein. Rigidity is desired to prevent the plate from buckling when subject to various load requirements. The plate can be curved to match the profile of the surface to which the plate will be attached (i.e., the curved sides of a tank or boat hull or for attaching various fiberglass automobile components, such as fenders, to the metal automobile).

In the preferred embodiment, the plate has a plurality of spaced-apart perforations located throughout the plate. The purpose of the perforations is to increase the effective surface area of the plate when the plate is attached to the laminate surface with adhesives and to allow the adhesive material to flow from the underside of the plate to the top surface of the plate, thereby totally encapsulating the plate in the adhesive material.

Located on the plate is a connecting device suitable for connecting the subject component (i.e., the leg, brace, wire or etc.) to the plate. For instance, if the component has a male threaded end the connecting device should comprise a female threaded connector. Alternatively, the connecting device can comprise the male threaded end, a snap-connector, a cotter pin arrangement or any one or more of commonly available devices for removably connecting one object to another. The connecting device can also comprise a welded connection when flexibility regarding the connection (i.e., the ability to disconnect the component from the plate) is not desired. The connecting device utilized can be attached to or manufactured integral with the plate.

Examples of various components and the corresponding connector includes: (1) a leg having a male threaded end with a female threaded opening; (2) an eye-hook having a male threaded end with a female threaded opening; (3) a pole having a female snap end with a male snap connector; (4) a brace having an opening at one end with a bolt member attached to the plate having a corresponding nut member; and (5) an angle member having one or more perforations with a corresponding number of bolt members attached to the plate. The above list is not intended to be comprehensive, as there are a large number of connectors that can attach to the plate for connecting the plate to the laminated surface.

To use the present invention, the user will identify the surface of a laminated object (such as a tank, boat or automobile fender) to which he or she desires to locate the composite connector and select a plate having a profile which corresponds to the profile of the object's surface. The user then applies an adhesive material to the surface and place the plate on the adhesive. If the plate has perforations, the user will apply sufficient pressure to the plate to cause the adhesive material to flow or ooze through the perforations and cover the plate. The plate is then covered with laminate material, such as fiberglass strips or mat, and additional adhesive, if needed. If the connection device was attached to or integral with the plate, the user must take care not to cover the connector with the laminate material. If the connection device was not attached to or integral with the plate, the user can add the connector to the plate by welding or otherwise attaching it to the plate after the laminate/adhesive material dries or cures to a solid condition. The user then can connect the leg, pole, wire or other object to the connector by screwing, bolting, welding or other method of connecting the object to the plate as is appropriate for the connector utilized.

Accordingly, the primary objective of the present invention is to provide a composite connector that removably connects an object to a laminate surface without damaging the integrity of the laminate surface.

It is also an important objective of the present invention to provide a composite connector comprised of a plate having a plurality of spaced-apart perforations and a connection device on the plate for removably connecting an object to the plate.

It is also an important objective of the present invention to provide a plate having a plurality of perforations and a connecting device thereon for connecting an object to a laminate surface.

It is also an objective of the present invention to provide a method for connecting a metallic object to a laminate surface without violating the integrity of that surface.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

Figure 5:
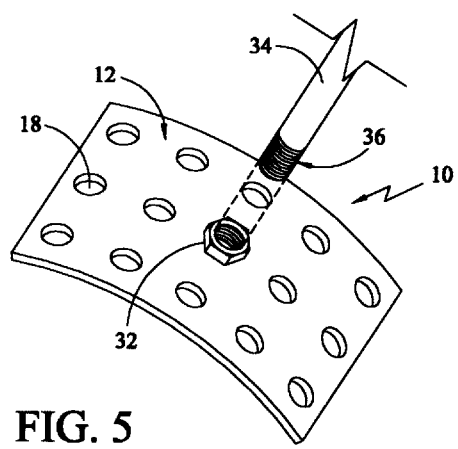
FIG. 5 is a perspective view of an alternative embodiment of the present invention.
Figure 6:
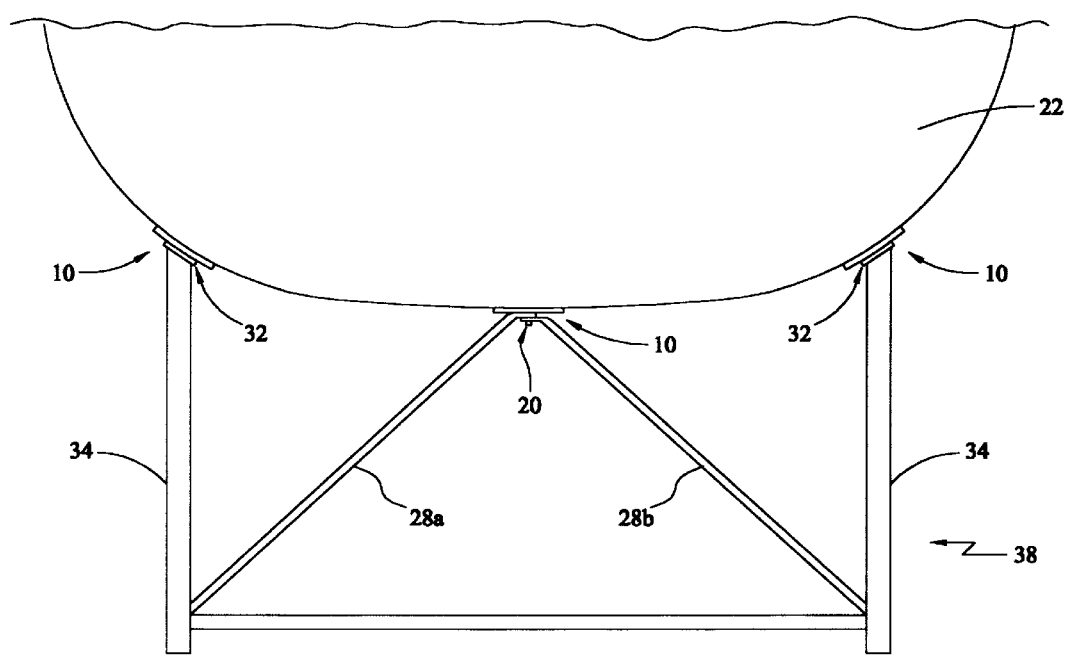
FIG. 6 is an end view of a bracing system for a fiberglass tank utilizing the composite connector of the present invention.

With reference to FIGS. 1–6 where like elements have been given like numerical designations to facilitate the reader's understanding of the present invention, the preferred embodiment of the present invention is set forth below. The composite connector of the present invention, designated generally as 10, includes a plate 12 having a top surface 14, bottom surface 16 and a plurality of perforations 18 therethrough. In the preferred embodiment, plate 12 is made of metal, however, plate 12 can be made of plastic or other non-metals that are of sufficient strength to provide support for a connection. Although plate 12 is shown as substantially square, it can be of virtually any shape or size. The material chosen for plate 12 should be sufficiently rigid to prevent plate 12 from buckling when subject to stress from the connection. Plate 12 can be curved, as shown in FIG. 5, to match the profile of the surface to which it will be attached. Perforations 18 increase the effective surface area of plate 12 when it is attached to the laminate surface with adhesives and allow the adhesive to flow from below bottom surface 16 to cover top surface 14, thereby totally encapsulating plate 12 with adhesive.

Connected or attached to or made integral with plate 12 is a connecting device 20, as shown in FIGS. 1–4. Connecting device 20 in FIGS. 1–4 is a stud or bolt attached to plate 12 by threading or welding. Connecting device 20 should be selected based on its strength characteristics and on the dimensional requirements for connecting to the desired object, such as braces 28a and 28b shown in FIGS. 4 and 6. As shown in FIG. 5, connecting device 32 can be used instead of device 20. Connecting device 32 is a female receptacle suitably sized to threadably connect to male connector 36 on the end of leg 34. As discussed above, the connecting device utilized with the present invention can be any device suitable for connecting an object, such as a leg, pole, wire or etc. to plate 12.

Prior to placing composite connector 10 on surface 22, adhesive material 24a should be spread on the area where composite connector 10 is needed. Adhesive 24a can be any type of material suitable for spreading on a surface and for bonding plate 12 to surface 22 and laminate materials (i.e., strips of fiberglass tape or sheet, shown as 26 in FIG. 3) to surface 22. The adhesive should be a thermoset resin or epoxy material that is substantially fluid until set, at which time it becomes infusible and insoluble. Examples of such resins are phenolic resins, polyesters, urea-resins, epoxide resins and melamine resins.

Figure 1:
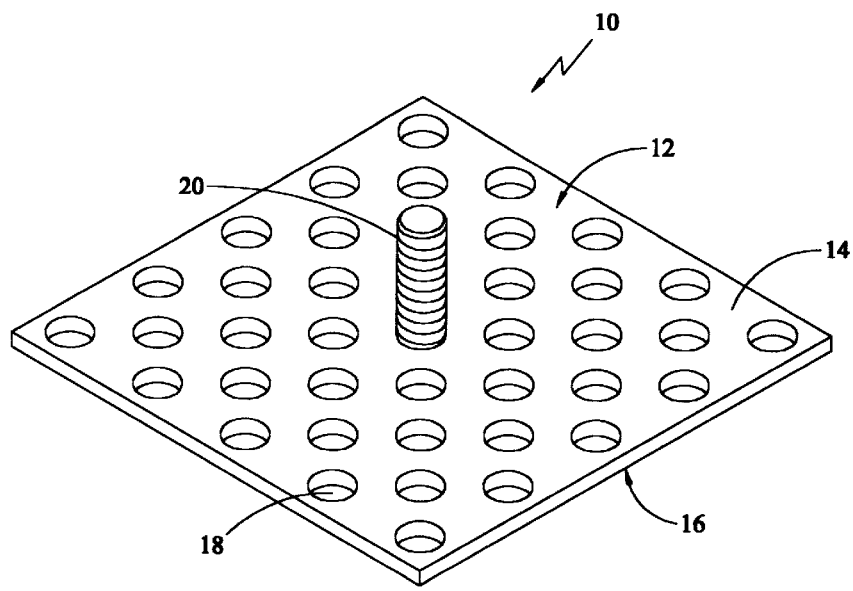
FIG. 1 is a perspective view of one embodiment of the composite connector of the present invention.
Figure 2:
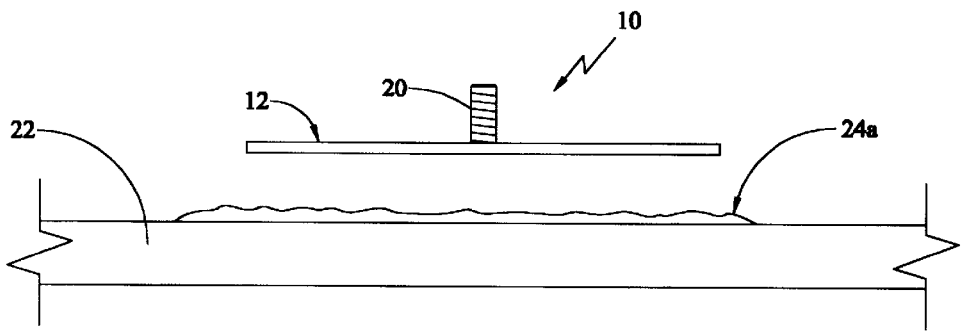
FIG. 2 is a side view of the embodiment illustrated in FIG. 1 showing the initial placement of adhesive material.
Figure 3:
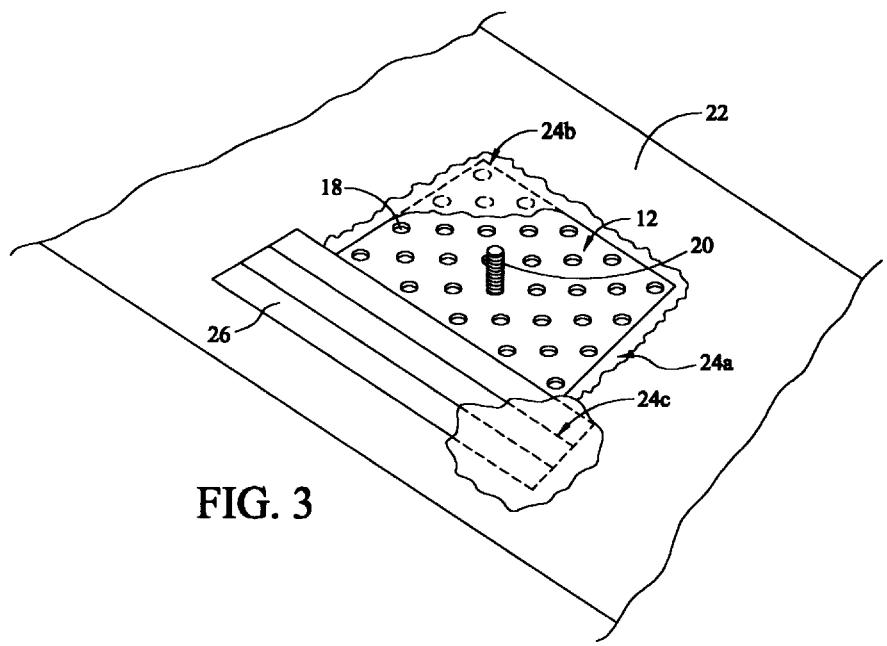
FIG. 3 is a perspective view of the present invention attached to a laminate surface.
Figure 4:
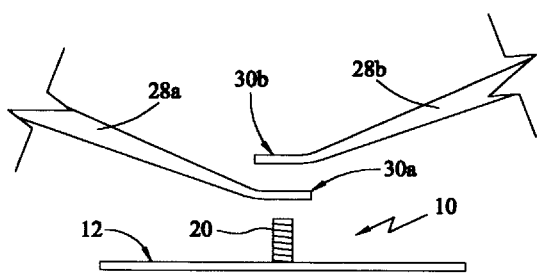
FIG. 4 is a side view showing attachment of braces to the embodiment of the present invention illustrated in FIG. 1.

To fixedly secure plate 12 to surface 22, strips of fiber-reinforced laminae 26, such as those having glass or carbon fibers embedded in a plastic resin, are placed over plate 12 and across the adjacent area of surface 22 to bond with adhesive 24a, including that portion of the adhesive which has oozed through perforations 18 to top surface 14 (shown as 24b in FIG. 3). Layers of laminae 26 are covered with additional adhesive (shown as 24c in FIG. 3) to fully encapsulate plate 12 in bonded laminae 26. There is a wide variety of fibrous reinforcement material available, including high-strength graphite fibers. Most of these materials are available in tape or sheet form for easy placement over plate 12. The number and thickness of laminae material 26, the thickness of the adhesive material 24a–c and the number and size of perforations 18 in plate 12 will determine the strength characteristics of the resultant composite connector 10 22 connection. Further variation in strength characteristics can be obtained through variation in the orientation of the various layers, or plies, of the laminae material 26.

To manufacture the composite connector 10 of the present invention, the user first selects the area on the laminate surface where he or she desires to have the composite connector 10. Based on the location, size, strength requirement and type of connector needed, the user selects a connecting device 20 or 32 and fixedly attaches it to plate 12. The area selected is then coated with adhesive material 24a suitable for bonding plate 12 and laminae strips 26 to surface 22. Plate 12 is then attached to adhesive material 24a and, if necessary, plate 12 is pushed into adhesive 24a to cause adhesive 24b to ooze through perforations 18 in plate 12. Strips of laminae 26 are placed over plate 12 in a manner that provides sufficient strength to hold plate 12 to surface 22 without interfering with the operation of connecting device 20 or 32. The entire combination of plate 12, adhesive 24a–c and laminae strips 26 are then allowed to cure. After curing, brace 28a/28b or leg 34 is connected to connecting device 20 or 32, as appropriate. If necessary, prior to coating surface 22 with adhesive 24a, the user can draw an outline of plate 12 on surface 22 to ensure proper placement of adhesive material 24a.

Alternatively, depending on how connecting device 20 or 32 is to be attached to plate 12, the user may decide to attach plate 12 to surface 22 prior to attaching connecting device 20 or 32 to plate 12. Clearly, if welding is to be used to strengthen the attachment of connecting device 20 or 32 to plate 12, care must be taken to avoid damaging surface 22.

WORKING EXAMPLE

For purposes of illustrating the composite connector of the present invention and the method of preparing the same, an example use is set forth. The following example is just one example representative of the many types of uses to which the composite connector is suitable. The example is for illustrative purposes only and is not intended to restrict the invention to a particular use or to the particular materials used in the example.

The inventor has found that the composite connector 10 of the present invention works well for use in tank stands (shown as 38 in FIG. 6) for fish farming purposes. Tanks used for fish farming are generally made of fiberglass and are sized and configured so that the tanks can stack inside each other when not in use. When the tanks are in use, it is beneficial to hold the tanks above the ground level by using metal stands. The metal stands currently used by most fish farmers rely on the weight of the filled tank to hold them in place or they are physically attached to the tank. Reliance on gravity can prove to be a costly mistake if the stands should shift. Physically attaching the stands to the tanks requires violating the integrity of the tank and substantially interferes with the farmer's ability to disassemble and store the tanks and stands. Use of composite connector 12 provides sufficient tank-to-stand connection to securely hold the tanks and yet allows the tanks to be easily disassembled from the stands and then stacked inside each other.

For fiberglass tank 22, the inventor has found that the use of a ⅛ inch thick steel plate 22 having ⅜ inch diameter perforations 18 spaced approximately 3/16 of an inch apart provides sufficient surface area for resin 24*a*–*b* to bond plate 12 to tank surface 22. For the center brace support connecting device, shown as 20, the inventor has found that the use of a ⅜ inch diameter stud screwed into one of perforations 18 provides sufficient support to attach braces 28*a* and 28*b* to tank 22. To further attach connecting device 20 to plate 12, the stud can also be welded to plate 12. For the standard fiberglass tank, the inventor has found that the use of isothalic resin, available from Composite Materials, Inc., works well with strips of fiberglass tape 26 also available from Composite Materials, Inc. After placing resin 24*a* on tank surface 22 and pushing plate 12 into resin 24*a*, causing resin 24*b* to ooze out around plate 12, the inventor places strips of the fiberglass tape 26 over plate 12 in a pattern that consists of alternating rows of tape 26.

For the leg supports, the inventor utilizes a 1½ inch diameter female pipe connection 32 that is suitable for threadably connecting to pipe 34 having a male threaded end 36. The female pipe connection 32 is welded to plate 12. For the leg support, plate 12 is made in a curved shape to match the curved profile of the tank along its edge.

To assemble the tank/tank stand combination, the inventor merely screws the male end 36 of pipe 34 into female connector 32, unfolds braces 28*a* and 28*b*, places the holes in brace ends 30*a* and 30*b* over connecting device 20 and tightens a nut onto connecting device 20 to secure ends 30*a* and 30*b* to plate 12. Other braces, not shown, connect the tank stand legs to a plate located near the center of the tank to provide support in the lateral direction. To disassemble the stand, the inventor merely reverses the above procedure. Once the legs and braces are removed, the tanks can be stacked inside each other.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape and use.

What is claimed is:

1. A composite connector for connecting an object to a laminate surface, comprising:

a plate having a top surface, a bottom surface and a plurality of spaced-apart perforations therethrough;

connecting means located on said plate for removably connecting the object to said plate;

an adhesive disposed between said bottom surface of said plate and the laminate surface, said adhesive substantially filling said plurality of perforations and totally encapsulating said top surface of said plate; and a plurality of fiber reinforcing strips over said plate, whereby said top surface of said plate is substantially covered by said reinforcing strips, said reinforcing strips bonding to said adhesive covering said plate, said connecting means being accessible to the object.

2. The composite connector according to claim 1, wherein said adhesive is a resin.

3. The composite connector according to claim 1, wherein said connecting means protrudes from said plurality of fiber reinforcing strips.

4. The composite connector according to claim 1, wherein said adhesive covers a portion of the laminate surface substantially adjacent to said plate and said plurality of fiber reinforcing strips extends over said portion of the laminate surface to bond with said adhesive on said portion of the laminate surface.

5. The composite connector according to claim 1, wherein said plurality of fiber reinforcing strips comprise fiberglass strips or fiberglass mat.

6. The composite connector according to claim 5, wherein said adhesive comprises a mixture of resin and fiberglass putty.

7. The composite connector according to claim 1, wherein said connecting means is suitable for removably connecting the object to said plate.

8. The composite connector according to claim 1, wherein said connecting means is a threaded stud protruding from said plurality of fiber reinforcing strips.

9. The composite connector according to claim 1, wherein said connecting means is a threaded receptacle.

* * * * *